April 5, 1966          A. BISHOP          3,244,371

TEMPERATURE CONTROL SYSTEM

Filed April 1, 1963

INVENTOR.
ANTHONY BISHOP

BY Lyon & Lyon

ATTORNEYS

United States Patent Office 3,244,371
Patented Apr. 5, 1966

3,244,371
TEMPERATURE CONTROL SYSTEM
Anthony Bishop, Agoura, Calif., assignor to Viking Industries Inc., Canoga Park, Calif., a corporation of California
Filed Apr. 1, 1963, Ser. No. 269,634
11 Claims. (Cl. 236—1)

The present invention relates to temperature control systems.

Briefly, the system disclosed herein involves a heat sink, a source (either a cold source or a hot source), an elongate body interposed in heat-conducting relationship between said source and said body to develop a temperature gradient along the length of the body, temperature-sensing means in heat-conducting relationship to and mounted on an intermediate region of said elongate body, and a component whose temperature is to be controlled mounted in heat-conducting relationship on said body with such sensing means and component being on regions of said body which are at substantially the same temperature established by such temperature gradient, i.e. these two regions lie in a plane on which each point is at the same temperature. The sensing means controls the source to maintain the temperature at such plane substantially constant by changing the temperature gradient along the body regardless of whether or not such component itself is a source of heat due to electrical current flowing therethrough.

It is therefore a general object of the present invention to provide new means and techniques for establishing close control of temperature.

A specific object of the present invention is to provide a system of this character which is dynamic in its operation in the sense that it requires a flow of heat for temperature stabilization purposes, thereby achieving certain advantages.

Another specific object of the present invention is to provide a system of this character which is relatively simple, considering particularly the close control in temperature achieved thereby.

Another specific object of the present invention is to provide a system of this character which follows environmental conditions in achieving close temperature control.

Another specific object of the present invention is to provide a temperature control system which is particularly suitable for the temperature control of solid state electrical components, whether or not they dissipate substantial amounts of heat.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a partially diagrammatic and partially structural drawing useful in explaining features of the present invention.

FIGURE 2 is a transverse sectional view through a practical embodiment of the present invention.

FIGURE 3 is a section taken along lines 3—3 of FIGURE 2.

FIGURE 4 is a schematic representation of a simplified control circuit in which the arrangement shown in FIGURE 2 is incorporated.

Certain features of the present invention are first described in connection with FIGURE 1 wherein a cylindrical body 10 is interposed in heat-conducting relationship between a source 11 (either a hot source or a cold source) and a sink 12 to establish a temperature gradient in body 10. The source 11, for purposes of description, is referred to as an electrical heating pad and the sink 12 is a mass of metal from which heat conducted thereto from body 10 is radiated. The body 10 being cylindrical, the temperature gradient, resulting from the flow of heat, establishes planes of constant temperature. Thus, for example, the plane 13, which is perpendicular to the axis of the cylindrical body, has points or regions thereon, all at the same temperature, but of higher temperature than points or regions of equal temperature on a plane 14 perpendicular to the axis of cylinder 10 and closer to the heat sink 12.

An important feature of the present invention involves mounting in heat-conducting relationship on said body 10 a temperature-sensing means 15, and various electrical components 16, 17, 18, 19 and 20 whose temperature is to be controlled in one of such equal temperature planes represented by plane 21. When none of such components dissipates heat, the temperature gradient is established substantially exclusively by the heated condition of heater 11 and the temperature of sink 12 and the gradient is uniform between the ends of both. This uniformity, however, is disturbed somewhat when such components dissipate heat. The body 10 is of preferably best heat-conduction material such as, for example, aluminum or copper round stock so as to minimize those disturbances in the otherwise uniform gradient and the heater 11 is maintained at sufficiently high temperature such that in all instances all heat flow from the heat-dissipating components is in the general direction of the heat sink with some of such heat from such components flowing also to the sensing element 15. Preferably, as described hereinafter, the sensing element is mounted centrally in the body 10 or at other strategic locations in relation to those components which dissipate heat. Indeed, the sensing element may be mounted somewhat on the downstream side of heat flow from the heat-dissipating component instead of precisely in the same plane 21 as such component for achieving what may be termed an anticipatory of compensatory effect, i.e., either in anticipation of heat from such component, or components, or to compensate for the heat from such components.

That portion of the body between the heater 11 and plane 21 may be represented by a heat resistance 24 using an analogous electrical symbol for that purpose and the resistance imposed to the flow of heat by the body portion between plane 21 and the heat sink may be likewise represented by the resistance 26. The effect of these resistances in controlling the heat flow may be supplemented by one or more shims 27 interposed between the heat sink 12 and the adjacent end of body 10, the heat resistance of the shim or shims 27 being represented by resistance 28. It will thus be seen that for a given heating effect produced by heater 11, the shim 27 is instrumental in controlling the temperature gradient in body 10 and establishing a particular temperature in plane 21. The shim 27, when used, is a thin disc of a material having a high thermal resistance, much higher than the thermal resistance of body 10. Shim 27 also serves as a convenient means for adjustment for heat leakage rate.

Preferably the plane 21, in which the sensor and components are mounted, is located remote from the heater 11 to use the section of material of body 10 between plane 21 and such heater as a heat integrator for assuring substantially parallel heat flow at its intersection with plane 21. Preferably this section has a solid cross section and its length is kept at a minimum in order to preserve a fast time and to avoid cycling in the control.

FIGURES 2 and 3 represent a practical embodiment of the present invention using the principles discussed above in connection with FIGURE 1. Like parts in the various figures have identical reference numerals for facilitating comparison.

In FIGURE 2 the temperature sensor 15 is in the form of a thermistor cemented by a good heat-conducting cement at the end of a blind bore 10A in body 10. The components whose temperature is to be controlled are cemented by a good heat-conducting cement in recessed portions 10B in body 10 with such cement preferably completely filling such recessed portions. The sensor and components lie in a constant temperature plane 21. The heat sink 12 is in the form of a metal enclosure having a main body portion 12A and a cover 12B in good heat-conducting relationship to each other. Good heat-insulating material 40 fills the enclosure 12A, 12B.

The various electrical leads from the heater 11, sensor 15 and components or their assembly may be connected to one or more sockets or connectors on the enclosure using various techniques which produce substantially no interference on the heat flow pattern in body 10. Preferably, a ring 42 of heat and electrical insulating material is mounted on a peripheral portion of body 10 using, for example, a cement, with soldering terminals 42A thereon to which various leads of the components may be interconnected as a subassembly. Those terminals 42A which require external connection are connected to leads which, together with leads from the heater 11, pass through a small apertured portion 10C in the body 10 and are connected, as are also the leads from sensor 15, to individual pins of a connector 45 mounted on the enclosure or heat sink 12A, 12B by small diameter bolts 47 that also serve to mount the body 10 on such heat sink with shim 27 interposed therebetween. If desired, the space within bore 10A and shim washer 27 may be filled with a good heat-conducting material which, if also of good electrical conducting qualities, is insulated from the pins of connector 45.

It will be obvious to those skilled in the art that many different systems may be used to control the heat produced by heater 11 in accordance with the temperature sensed by the sensor 15 such that more heat is developed by heater 11 when the temperature sensed by sensor 15 drops and likewise to reduce the heat produced by heater 11 when the sensed temperature rises. Such systems are exemplified in FIGURE 4 wherein the temperature sensor 15 in the form of a thermistor is connected to a control circuit 50 which may include servo loops with the output of such control circuit being connected to heater 11.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a temperature control system of the character described for controlling the temperature of a component, the combination including, an elongate metallic body, a heat sink directly in heat communication with said body, a heating source in direct heat communication with said body for producing a flow of heat from said source through said metallic body to said heat sink to establish a temperature gradient through said body with planes of equal temperature therein between said source and said heat sink, temperature-sensing means, a component whose temperature is to be controlled, said sensing means and said component being located remotely from said heat sink and said source in one of said planes of equal temperature and in direct heat-conducting relationship to said body, said metallic body having a first hollow portion within which said sensing means is embedded, said body having a second hollow portion within which said component is embedded.

2. A system as set forth in claim 1 including means for controlling said heat source in response to the temperature sensed by said sensing means to maintain the temperature of said component substantially constant.

3. A system as set forth in claim 2 in which said component is an electrical component which when energized develops sufficient heat to influence the temperature in said one plane.

4. The combination as set forth in claim 1 wherein said body is generally cylindrical and said source is mounted in heat relationship on one end of said cylindrical body.

5. The combination as set forth in claim 4 including a shim offering substantial resistance to heat flow between the other end of said body and said heat sink and controlling the flow of heat from said body to said heat sink.

6. The combination as set forth in claim 4 in which a disc of insulating material is mounted on said cylindrical body, and at least one terminal on said disc is electrically connected to said component.

7. The combination as set forth in claim 1 in which said heat sink is a metal casing enclosing said body.

8. The combination as set forth in claim 7 in which insulating material is between said casing and said body.

9. In a temperature control system of the character described, the combination including, a cylindrical heat-conducting body, a heat sink in heat-conducting relationship to one end of said body, a source in heat-conducting relationship to the other end of the body for producing a temperature gradient along the length of said body, a temperature-sensing means mounted in heat-conducting relationship to said body at a region intermediate the ends of said body and being embedded within and interiorly along the axis of said cylindrical body, a component whose temperature is to be controlled being mounted in heat-conducting relationship to said body in a recessed portion in a peripheral portion of said cylindrical body, said component and said temperature-sensing means being in a common plane which is perpendicular to the axis of said cylindrical body.

10. The combination as set forth in claim 9 in which said heat sink is a metal enclosure enclosing said body and a heat flow controlling shim offering substantial resistance to heat flow is positioned between said one end of said body and said enclosure.

11. A system as set forth in claim 1 in which said metallic body is cylindrical, said heat sink and said heating source being at opposite ends of said cylindrical body, said cylindrical body having a hollow central core portion within which said sensing means is embedded, said cylindrical body having a plurality of peripherally spaced cavity portions in one of which said component is embedded, and other components whose temperatures are to be controlled being embedded in a corresponding one of said cavity portions, at least one of said components being a source of heat.

References Cited by the Examiner

UNITED STATES PATENTS

| 1,358,071 | 11/1920 | Fulton. | |
|---|---|---|---|
| 2,032,433 | 3/1936 | Osnos | 236—1 |
| 2,898,434 | 8/1959 | Lemmerman et al. | |
| 2,955,185 | 10/1960 | Cox | 236—1 |

JAMES W. WESTHAVER, *Primary Examiner.*